(12) United States Patent
Yau

(10) Patent No.: US 7,778,665 B2
(45) Date of Patent: Aug. 17, 2010

(54) PDA ARRANGEMENT HAVING MULTI-KEYPAD, MULTI-CARD AND SYNCHRONOUSLY COPYING MULTI-CARD

(76) Inventor: Yimwai Yau, Rm.611, Shangbu Gongmao Building • No.6, zhenxing Road • Futian, Shenzhen, Guangdong (CN)

( * ) Notice: Subject to any disclaimer, the term of this patent is extended or adjusted under 35 U.S.C. 154(b) by 312 days.

(21) Appl. No.: 11/547,935

(22) PCT Filed: Apr. 1, 2005

(86) PCT No.: PCT/CN2005/000431

§ 371 (c)(1),
(2), (4) Date: May 14, 2007

(87) PCT Pub. No.: WO2005/098574

PCT Pub. Date: Oct. 20, 2005

(65) Prior Publication Data
US 2008/0305830 A1    Dec. 11, 2008

(30) Foreign Application Priority Data
Apr. 9, 2004    (CN)    .................... 2004 2 0044566 U

(51) Int. Cl.
*H04M 1/00*    (2006.01)

(52) U.S. Cl. ................ 455/556.2; 455/90.3; 455/456.2; 455/556.1; 455/557; 455/575.1; 400/689
(58) Field of Classification Search .............. 455/556.2, 455/90.3, 456.2, 556.1, 557, 575.1; 400/689
See application file for complete search history.

(56) References Cited

U.S. PATENT DOCUMENTS

2003/0137803 A1* 7/2003 Loo ........................... 361/680
* cited by examiner

*Primary Examiner*—Nghi H Ly
*Assistant Examiner*—Amancio Gonzalez
(74) *Attorney, Agent, or Firm*—Raymond Y. Chan; David and Raymond Patent Firm

(57) ABSTRACT

A PDA arrangement includes a PDA station and a PDA device detachably mounted thereto. The PDA station includes a first casing and a second casing pivotally connecting thereto edge-to-edge, wherein the first casing includes a first PDA-functional keypad and a computer-functional keypad on inner and outer sides thereof, wherein the second casing includes a second PDA-functional keypad. The first casing further has an accessing window. The PDA device is detachably mounted at the accessing window of the PDA station and is wirelessly communicating with the PDA station. The PDA station further has a plurality of card holders provided on the second casing, wherein each of the card holders is adapted for operatively holding a data card thereat such that data stored at the PDA device is synchronously copied to the data cards respectively held at the card holders through the PDA station.

6 Claims, 8 Drawing Sheets

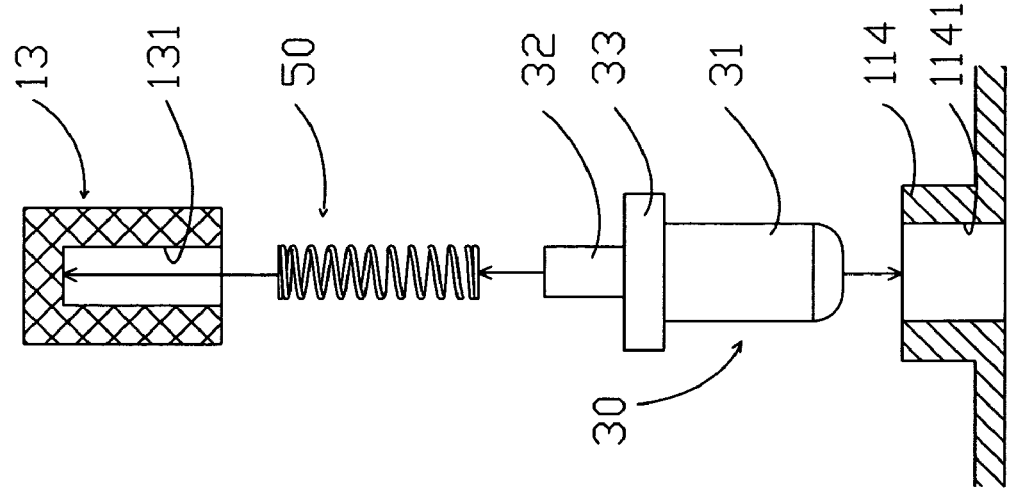
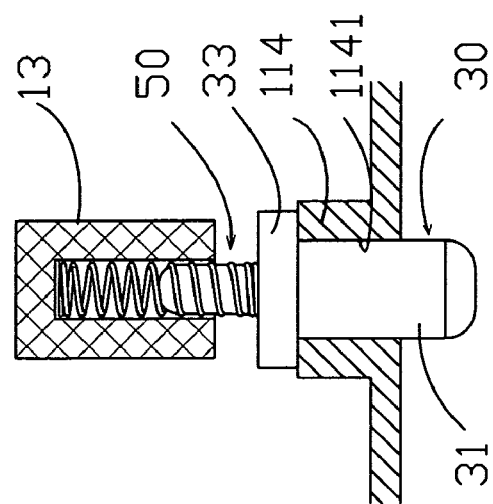
FIG.6A
FIG.6B

PDA ARRANGEMENT HAVING MULTI-KEYPAD, MULTI-CARD AND SYNCHRONOUSLY COPYING MULTI-CARD

BACKGROUND OF THE PRESENT INVENTION

1. Field of Invention

The present invention relates to a PDA (personal Data Assistant) for educational purpose, and more particularly to a palm computer which comprises a multi-functional keypad and a plurality of card holders for synchronously copying data to a plurality of data cards.

2. Description of Related Arts

In a traditional education system, a schoolbag is one of the necessary items for a student, especially from elementary school to high school, to carry the textbooks to the school. Accordingly, the schoolbag, such as a backpack, is considered as a transportation tool to carry the heavy textbooks between home and school without other additional function. The student must carry the backpack filled with the heavy textbooks everyday such that the relatively heavy weight of the backpack can pull the student backwards. Therefore, the student must bend his/her body forward to balance his/her body so as to compress the spine unnaturally. Such heavy backpack can cause the student to develop should, neck and back pain. Therefore, many parents seek for such unsolvable solution. On the other hands, since the technologies rapidly change from day to day, a palm size PDA (personal Data Assistant) are commonly used. Many people try to substitute the PDA for the conventional backpack to storage the digital information from the textbooks. However, the PDA still has a limited expandable use for educational purpose in which the PDA cannot be considered as a perfect substitution of the conventional backpack.

SUMMARY OF THE PRESENT INVENTION

A main object of the present invention is to provide a palm size PDA arrangement which comprises a multi-functional keypad and a plurality of card holders for synchronously copying data to a plurality of data cards, such that the palm size PDA arrangement is considered as a perfect substitution of the conventional backpack.

Accordingly, in order to accomplish the above object, the present invention provides a palm size PDA arrangement which comprises a PDA station 10 having built-in operation circuit and comprising a first casing 11 and a second casing pivotally connected to the first casing 11 edge-to-edge to pivotally fold the first casing 11 on the second casing 12 in an overlapped manner. The first casing 11, having an outer side and an opposed inner side, comprises a first PDA-functional keypad 111 provided on the inner side and a computer-functional keypad 112 provided on the outer side. The second casing 12, also having an outer side and an opposed inner side, comprises a second PDA-functional keypad 121, wherein the second PDA-functional keypad 121 has the same function of the first PDA-functional keypad 111. The first casing 11 further has an accessing window 113 provided thereon wherein the accessing window 113 is a through window formed from the outer side of the first casing 11 to the inner side thereof. The PDA arrangement further comprises a PDA device 20 detachably mounted to the PDA station 10 at the accessing window 113 thereof. The second casing 12 further has a plurality of card holders 122 operatively linked to the operation circuit for accessing data from a data card 40 held at one of the card holders 122, wherein the PDA device 20 is adapted to wirelessly link to the data card 40 via infrared signal transmission when the data card 40 is held at one of the card holders 122, such that when two or more data cards 40 are held at the card holders 122 respectively, the data from the PDA device 20 is copied to the data cards 40 synchronously.

The PDA arrangement further comprises at least two sets of metal made resilient connectors 30 respectively provided at a top edge and a bottom edge of the accessing window 113 to detachably mount the PDA device 20 within the accessing window 113 in position. The resilient connectors 30 at the top edge of the accessing window 113 are aligned with the resilient connectors 30 at the bottom edge of the accessing window 113. The PDA device 20 has a plurality of connector slots 21 formed along a top rim and a bottom rim respectively, wherein the resilient connectors 30 are detachably engaged with the connector slots 21 respectively to detachably mount the PDA device 20 to the PDA station 10 at the accessing window 113 thereof.

Each of the resilient connectors 30 comprises an elongated connector head 31, an elongated connector tail 32, and a retaining body 33 extended between the connector head 31 and the connector tail 32. Accordingly, the accessing window 113 of the first casing 11 has a boundary frame 114 defining the top and bottom edges thereat, wherein the boundary frame 114 has a plurality of spaced apart connector holes 1141 formed thereon. The first casing 11 further comprises a plurality of connector seats 13 spacedly supported in the boundary frame 114, wherein each of the connector seats 13 has a retaining slot 131 aligning with the corresponding connector hole 1141. A resilient element 50, such as a compression spring, is disposed in the retaining slot 131, wherein the retaining body 33 of each of the resilient connectors 30 is biased against the boundary frame 114 to retain the connector tail 32 therewithin. In other words, the connector head 31 fits into the connector slot 21 to securely retain the PDA device 20 within the accessing window 113.

Each of the resilient connectors 30 is slidably mounted at the boundary frame 114 through the respective connector hole 1141 at a position that the connector head 31 is slidably protruded from the boundary frame 114 through the respective connector hole 1141 while the connector tail 32 is disposed at the retaining slot 131 of the respective connector seat 13 and is urged by the resilient element 50.

The PDA station 10 further comprises at least two wireless transceivers coupling in a serial connection and has at least two wireless transceiver windows 1131 which are provided at the top and bottom edges of the accessing window 113 respectively and are positioned aligning with the wireless transceivers respectively, wherein when the PDA device 20 is detachably mounted at the accessing window 113, the wireless transmitter of the PDA device 20 is aligned with the wireless transceiver through the wireless transceiver windows 1131. It is worth to mention that the wireless transceivers are electrically coupling with the operation circuit. Preferably, the wireless transceivers are infrared transceivers wirelessly transmitting data by infrared signal.

The second casing 12 further comprises a speaker unit 60, an external port 70 for communicatively connecting an external device, a rechargeable battery 80 electrically connect to the operation circuit, and a circuit board 90 printed with the operation circuit thereon, wherein the circuit board 90 is operatively connected to the resilient connectors 30 via cables to connect the operation circuit with the resilient connectors 30.

Accordingly, the present invention takes advantages, including multi-function ability, large data storage, and portability, of the conventional PDA. The present invention improves the conventional PDA to provide two or more sets of multi-functional keypads for easy access. Most importantly, the PDA arrangement of the present invention is adapted to synchronously copying data from the PDA device to the data cards. Therefore, the PDA arrangement of the present invention is considered as a perfect substitution of the conventional backpack to store all information of the textbook in digital manner. In addition, the PDA arrangement of the present invention further provides expandability of storage, sound generation through the external port, and synchronously copying ability. The present invention further enhances the mobility, interactivity and connectivity of the education tool. For personal use, the present invention enhances the portability and accessibility such that the present invention is user-friendly for every user.

These and other objectives, features, and advantages of the present invention will become apparent from the following detailed description, the accompanying drawings, and the appended claims.

BRIEF DESCRIPTION OF THE DRAWINGS

FIG. 1 is a perspective view of a PDA arrangement according to a preferred embodiment of the present invention, wherein

FIG. 2 is a perspective view of the PDA arrangement according to the above preferred embodiment of the present invention, wherein

FIG. 3 is a perspective view of the PDA arrangement according to the above preferred embodiment of the present invention, wherein

FIG. 6 illustrates the resilient connector of the PDA arrangement according to the above preferred embodiment of the present invention, wherein FIG. 6A illustrates an exploded view of the resilient connector and FIG. 6B illustrates a section view of the resilient connector.

DETAILED DESCRIPTION OF THE PREFERRED EMBODIMENT

Figure 1A:
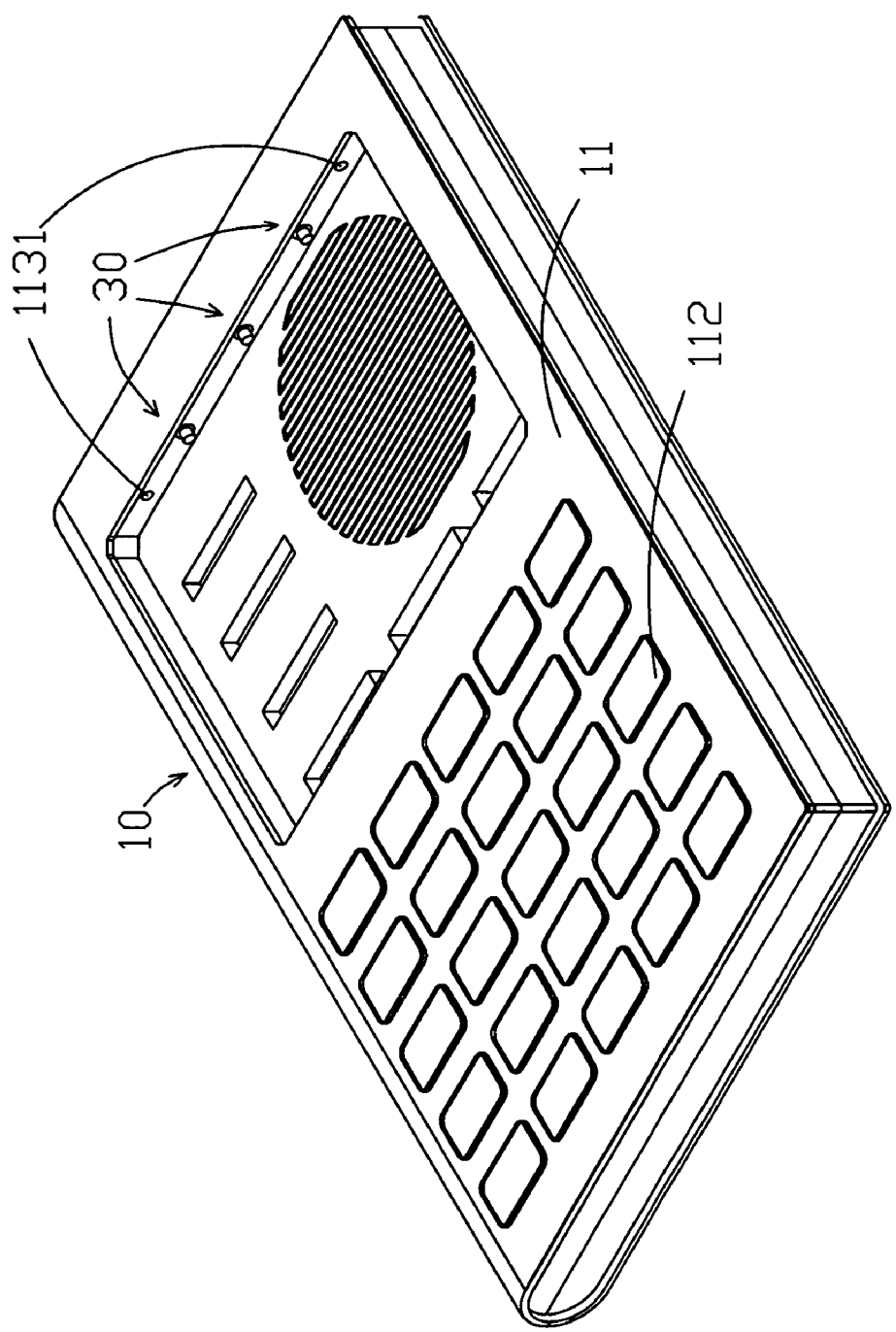
FIG. 1A illustrates the first and second casings pivotally folded at a closed position and FIG. 1B illustrates the first and second casings pivotally folded at an opened position.
Figure 1B:
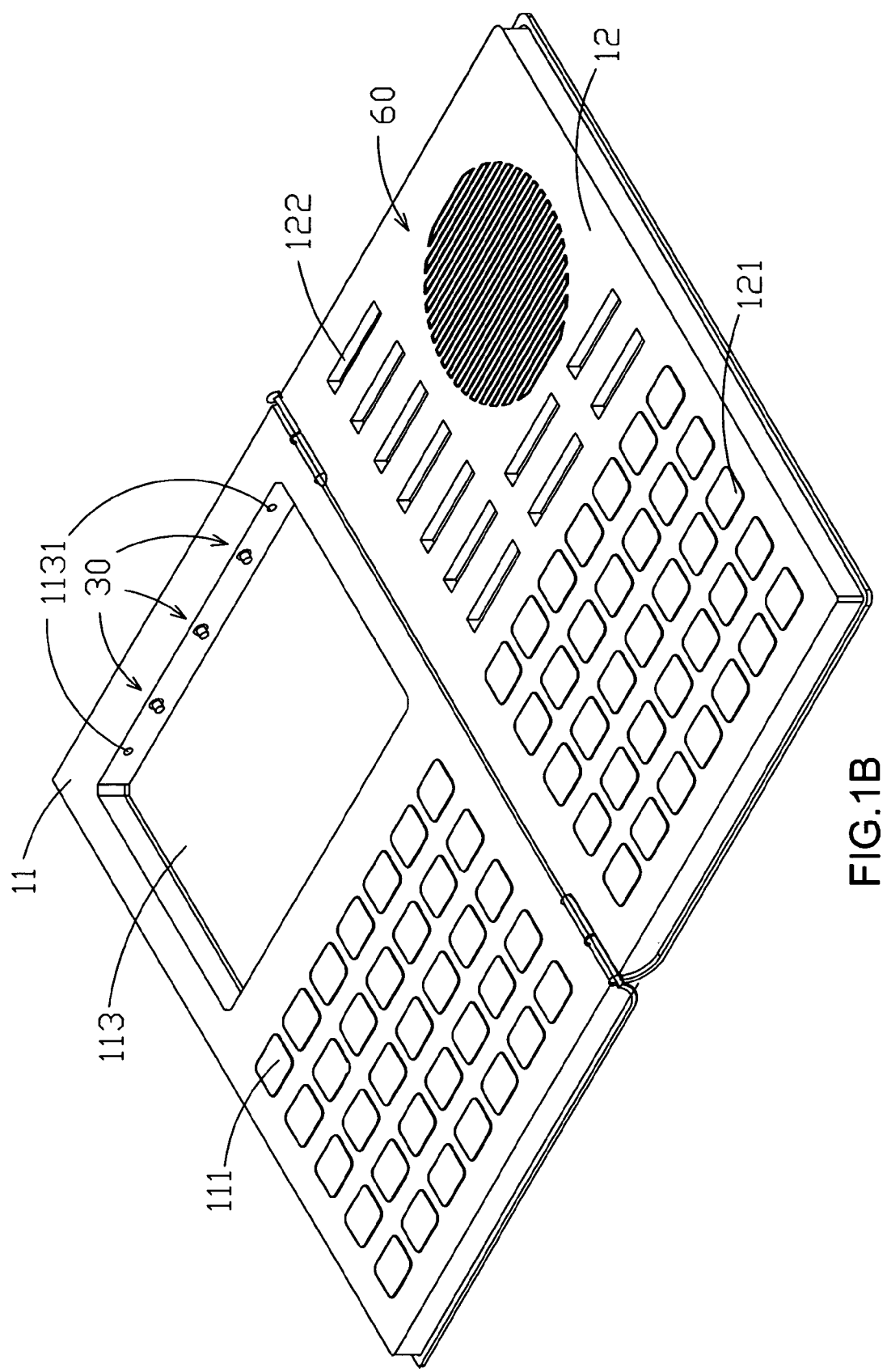
Figure 3A:
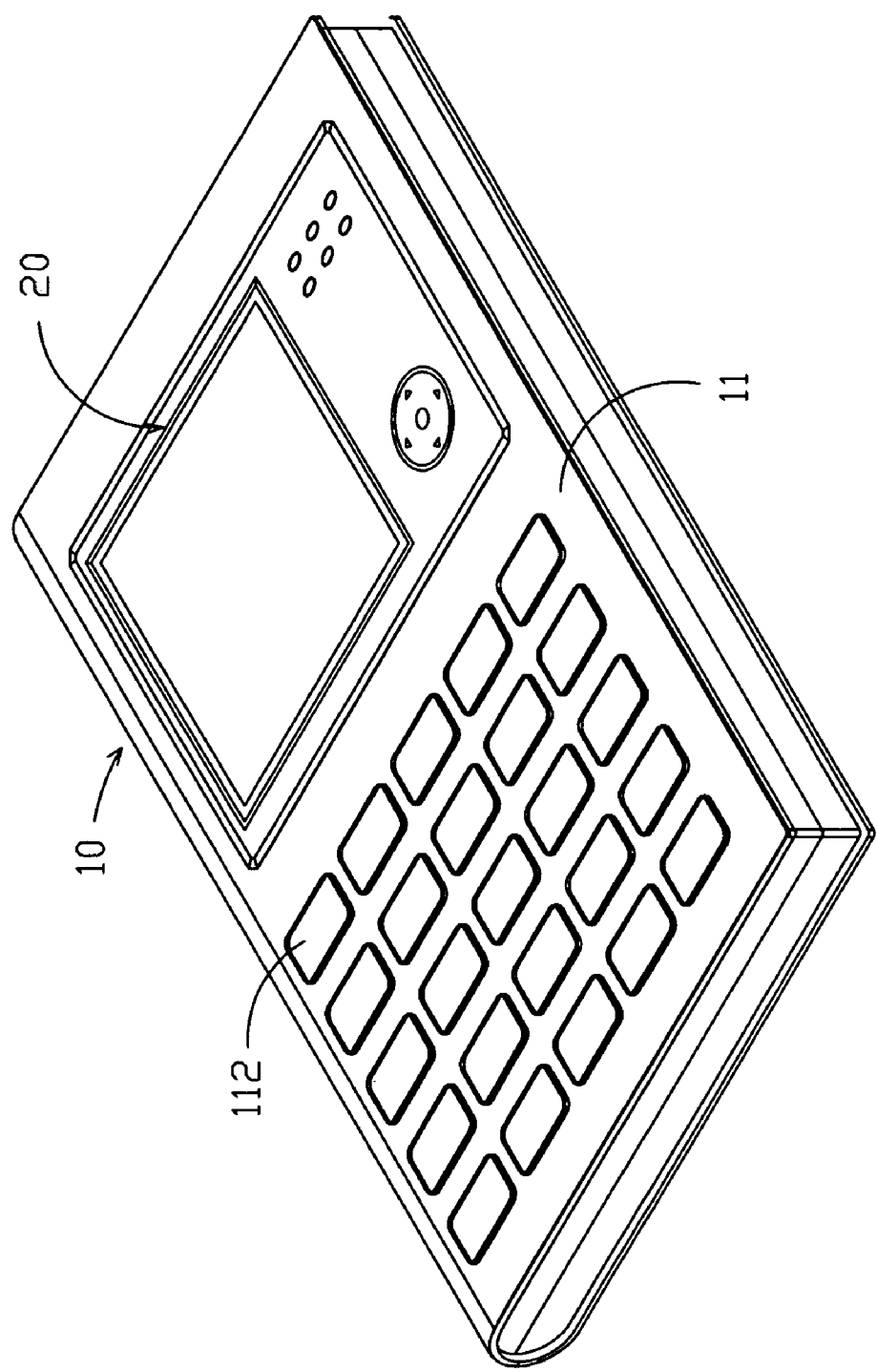
FIG. 3A illustrates the PDA device mounted at the PDA station at the closed position and FIG. 3B illustrates the PDA device mounted at the PDA station at the opened position.
Figure 3B:
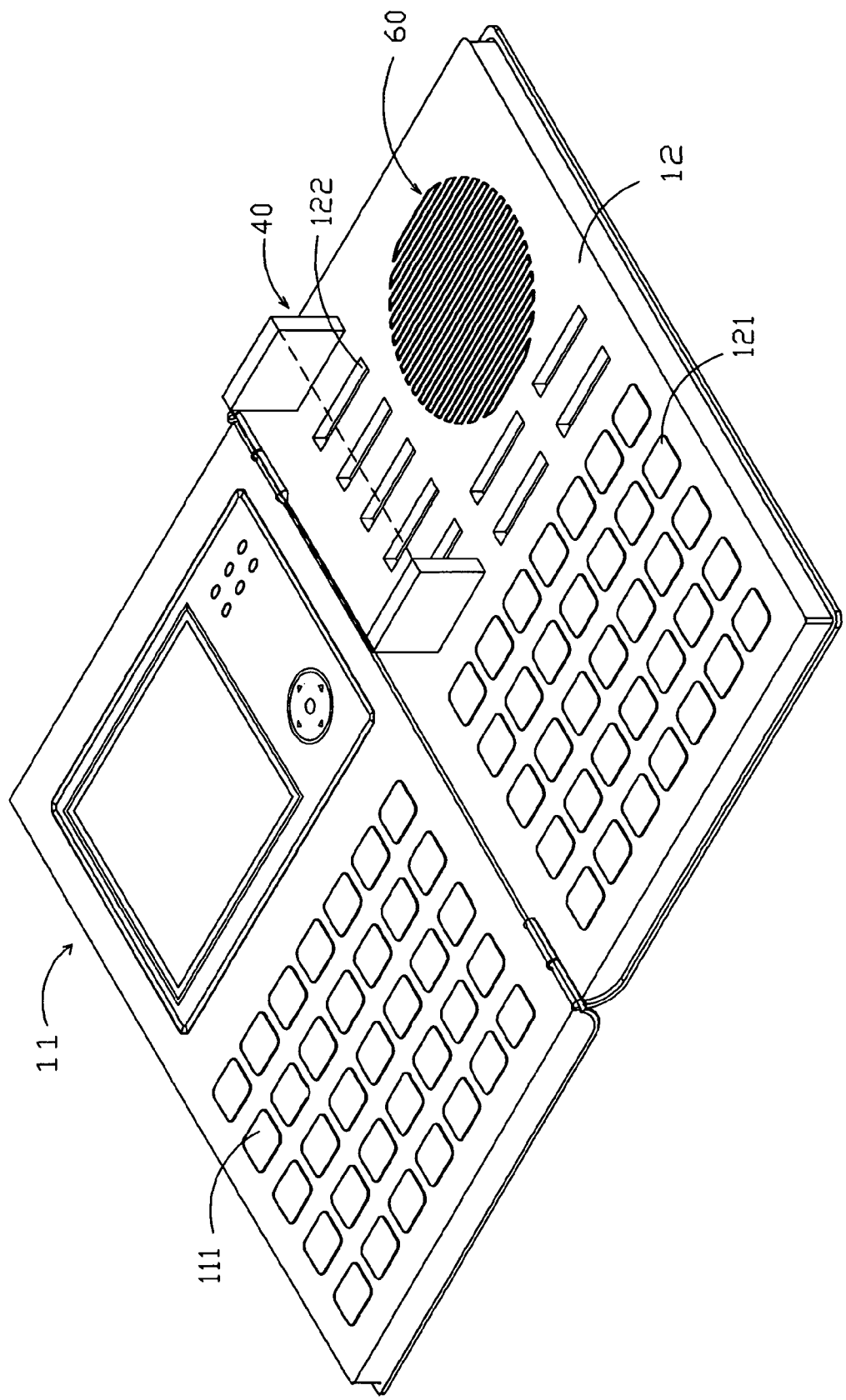
Figure 5:
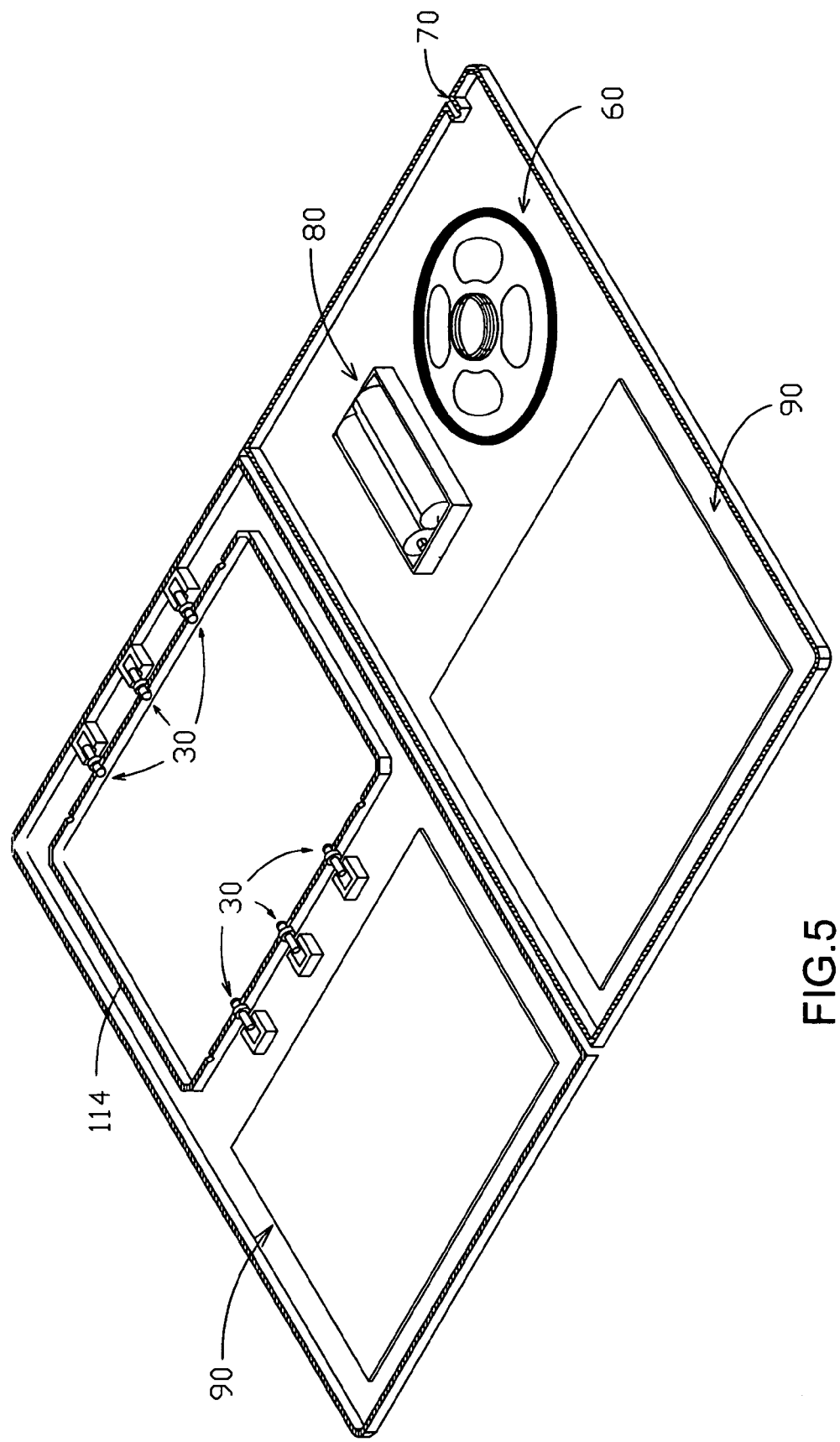
FIG. 5 is a sectional perspective view of the PDA arrangement according to the above preferred embodiment of the present invention.

Referring to FIGS. 3A and 3B of the drawings, a PDA arrangement according to a preferred embodiment of the present invention is illustrated, wherein the PDA arrangement comprises a PDA station 10, a PDA device 20, a plurality of resilient connectors 30, and a plurality of data cards 40. The PDA station 10, which is constructed with a flip structure, comprises a first casing 11 and a second casing 12 pivotally connected edge-to-edge via a pivot hinge, wherein the size and shape of the first casing 11 is symmetrical to that of the second casing 12. Each of the first and second casings 11, 12 has an outer side and an inner side. The PDA station 10 is folded at a closed position that the first casing 11 is overlapped on the second casing 12. The PDA station 10 is folded at an opened position that the first casing 11 is aligned with the second casing 12 side by side. The PDA station 10 comprises a PDA operation circuit and a data copying circuit to form an integrated circuit. As shown in FIG. 5, the PDA operation circuit and the data copying circuit are printed on a circuit board 90 to support in the first and second casings 11, 12. For easy operation, the present invention divides the input device into a PDA input device and a computer input device. As shown in FIGS. 1A and 1B, the first casing 11 comprises a first PDA-functional keypad 111 provided on the inner side and a computer-functional keypad 112 provided on the outer side. The second casing 12 comprises a second PDA-functional keypad 121 provided on the inner side of the second casing 12, wherein the second PDA-functional keypad 121 has the same function of the first PDA-functional keypad 111. Accordingly, the first and second PDA-functional keypads 111, 121 are a standard computer keyboard input while the computer-functional keypad 112 is a numeral input for mathematically calculation, so as to prevent any input confusion for the user.

As shown in FIGS. 1A and 1B, the first casing 11 further has an accessing window 113 provided thereon wherein the accessing window 113 is a through window formed from the outer side of the first casing 11 to the inner side thereof. The accessing window 113 of the first casing 11 has a boundary frame 114 defining the top and bottom edges thereat, wherein the boundary frame 114 has a plurality of spaced apart connector holes 1141 formed thereon. The resilient connectors 30 are provided at the top edge and the bottom edge of the accessing window 113 to detachably mount the PDA device 20 within the accessing window 113 in position. The resilient connectors 30 at the top edge of the accessing window 113 are aligned with the resilient connectors 30 at the bottom edge of the accessing window 113. As shown in FIGS. 6A and 6B, each of the resilient connectors 30 comprises an elongated connector head 31, an elongated connector tail 32, and an enlarged retaining body 33 extended between the connector head 31 and the connector tail 32. The first casing 11 further comprises a plurality of connector seats 13 spacedly supported in the boundary frame 114, wherein each of the connector seats 13 has a retaining slot 131 aligning with the corresponding connector hole 1141. A resilient element 50, such as a compression spring, is disposed in the retaining slot 131, wherein the connector tail 32 is coaxially engaged with the resilient element. Accordingly, the resilient element 50 applies an urging force against the resilient connector 30 to slidably pull the connector head 31 out of the boundary frame 114 within the accessing window 113 through the connector hole 1141 until the retaining body 33 is blocked by the boundary frame 14. In other words, when an inward pushing force is applied at the connector head 31, the connector head 31 is pushed into the boundary frame 114 through the connector hole 1141. Accordingly, each of the resilient connectors 30 are made of conductive metal such that the resilient connectors 30 form a plurality of terminals of the PDA station 10. In other words, the resilient connectors 30 operatively connect to the operation circuit, the speaker unit 60, and the external port 70. The PDA device 20 has a plurality of connector slots 21 formed along a top rim and a bottom rim respectively, wherein the connector heads 31 of the resilient connectors 30 are detachably engaged with the connector slots 21 respectively to detachably mount the PDA device 20 to the PDA station 10 at the accessing window 113 thereof. It is worth to mention that the PDA device 20 is adapted to detachably mount to the PDA station 10 either at the opened position or closed position. At the opened position, the front face of the PDA device 20 is aligned with the inner side of the first casing 11. At the closed position, the PDA device 20 is flipped 180 degrees that the front face of the PDA device 20 is aligned with the outer side of the first casing 11. In other words, the user is able to access the first PDA-functional keypad 111 and the computer-functional keypad 112 of the first casing 11 to control the PDA device.

Figure 2B:
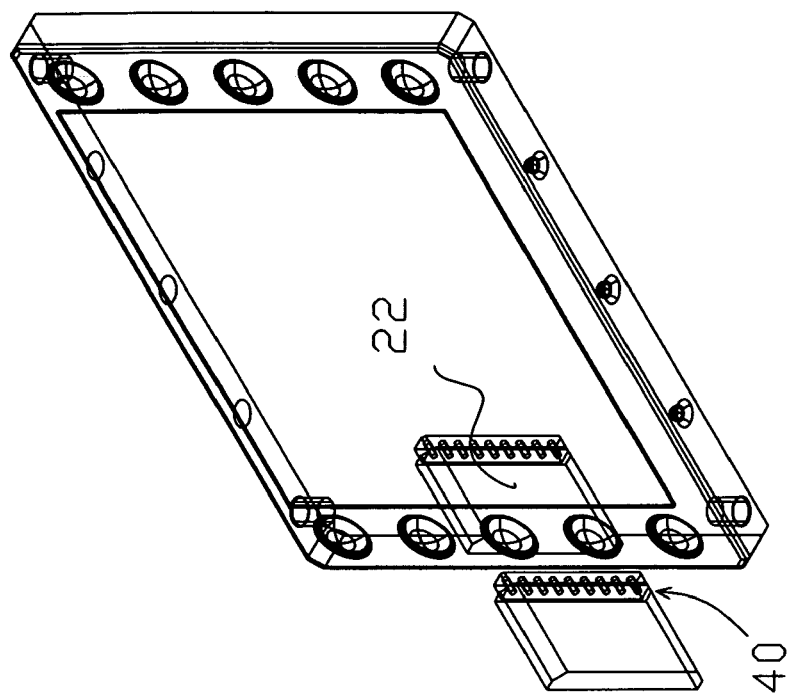
FIG. 2A illustrates a front perspective view of the PDA device and FIG. 2B illustrates a rear perspective view of the PDA device.
Figure 2A:
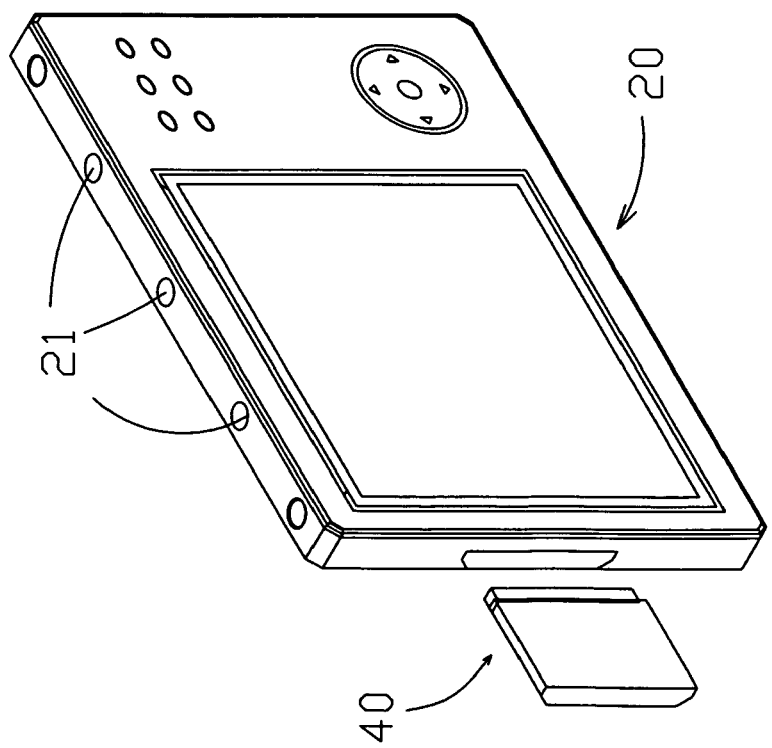
Figure 4:
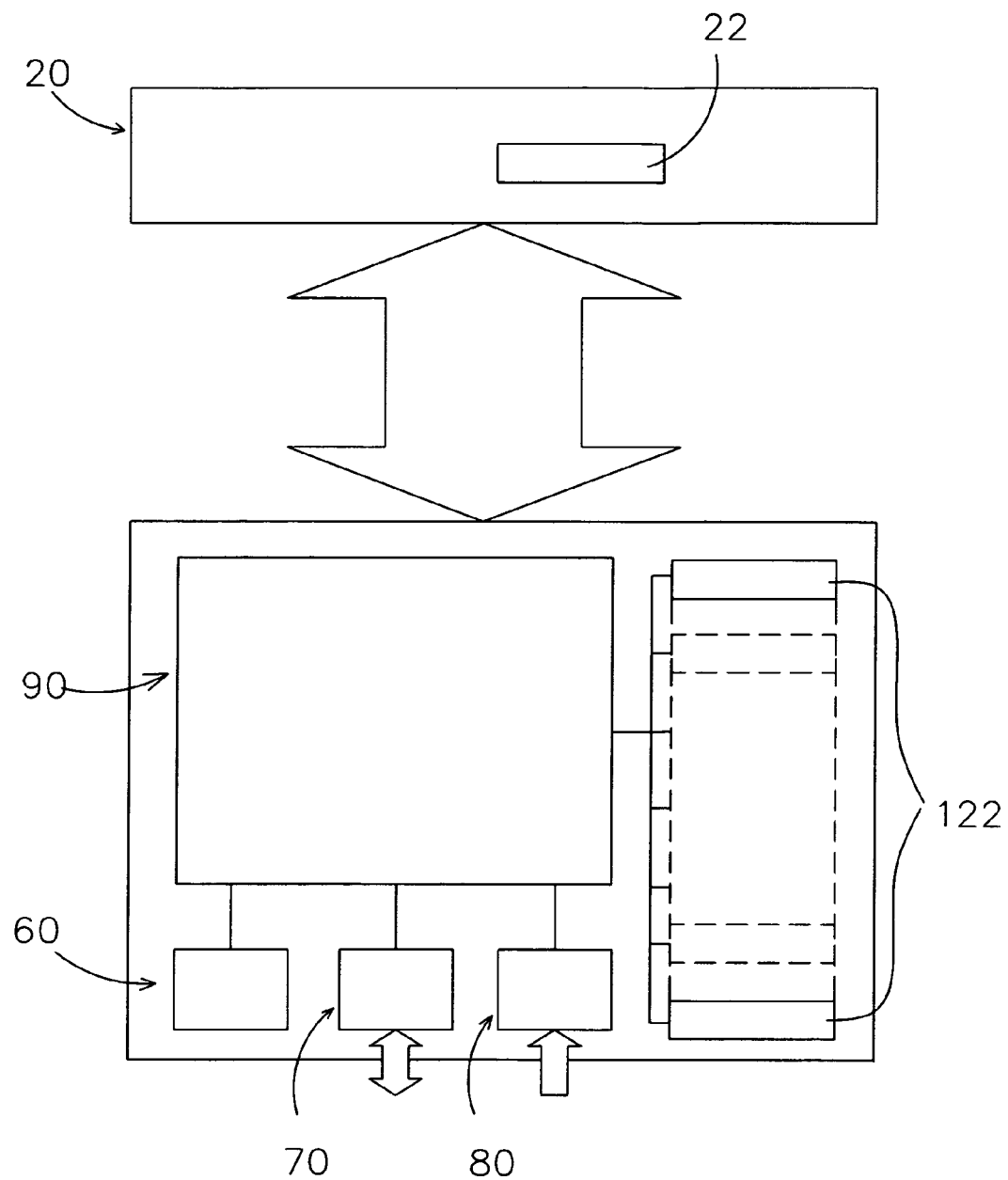
FIG. 4 illustrates a circuit configuration of the PDA arrangement according to the above preferred embodiment of the present invention.

As shown in FIGS. 2A and 2B, the PDA device 20 further has a PDA card slot 22 provided at a side edge to communicatively receive the data card 40, wherein the data storage in the data card 40 is read and displayed on a screen of the PDA device 20. As shown in FIG. 4, the PDA station 10 is wirelessly connecting with the PDA device 20 to transmit the data therebetween. The PDA station 10 further comprises at least two wireless transceivers coupling in a serial connection and has at least two wireless transceiver windows 1131 which are provided at the top and bottom edges of the accessing window 113 respectively and are positioned aligning with the wireless transceivers respectively, wherein when the PDA device 20 is detachably mounted at the accessing window 113, the wireless transmitter of the PDA device 20 is aligned with the wireless transceiver through the wireless transceiver windows 1131. It is worth to mention that the wireless transceivers are electrically coupling with the operation circuit. Preferably, the wireless transceivers are infrared transceivers wirelessly transmitting data by infrared signal. By wirelessly transmitting the data between the PDA station 10 and the PDA device 20, the PDA device 20 is adapted to detachably mount at the accessing window 113 of the PDA station 10 either at the opened position or at the closed position.

As shown in FIGS. 3A and 3B, the second casing 12 further has a plurality of card holders 122 which are spacedly provided on the inner side of the second casing 12 and are operatively linked to the operation circuit for accessing data from the data card 40 held at one of the card holders 122. Therefore, the PDA device 20 is adapted to wirelessly link to the data card 40 thereat via infrared signal transmission when the data card 40 is held at one of the card holders 122. In other words, when two or more data cards 40 are held at the card holders 122 respectively, the data from the PDA device 20 is copied to the data cards 40 synchronously. It is worth to mention that the card holders 122 can be different types of card readers to read different types of data cards. As a result, the data at the PDA device 20 can be simply copied to numbers of data cards 40 at the card holders 122 through the PDA station 10.

As shown in FIG. 5, the second casing 12 further comprises a speaker unit 60 provided at the inner side of the second casing 12, an external port 70 for communicatively connecting an external device, a rechargeable battery 80, and a circuit board 90 printed with the operation circuit thereon, wherein the circuit board 90 is operatively connected to the resilient connectors 30 via cables to connect the operation circuit with the resilient connectors 30. Accordingly, the speaker unit 60 is adapted for generating an audio output after an audio signal is amplified from the PDA device 20. The external port 70 is adapted to communicatively connect to any external computer device. The rechargeable battery 80 is adapted to connect to an external power for recharging so as to enhance the portability of the PDA arrangement.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A PDA arrangement, comprising:
   a PDA station, having a built-in operation circuit, comprising a first casing and a second casing pivotally connecting thereto edge-to-edge, wherein said first casing comprises a first PDA-functional keypad provided on an inner side and a computer-functional keypad provided on an outer side, wherein said second casing comprises a second PDA-functional keypad provided on an inner side thereof, wherein said first casing further has an accessing window which is a through window formed from said outer side of said first casing to said inner side thereof;
   a PDA device which is detachably mounted at said accessing window of said PDA station and is wirelessly communicating with said PDA station, wherein said PDA station further has a plurality of card holders provided on said second casing to operatively link to said operation circuit, wherein each of said card holders is adapted for operatively holding a data card thereat such that data stored at said PDA device is synchronously copied to said data cards respectively held at said card holders through said PDA station.

2. The PDA arrangement, as recited in claim 1, further comprising a plurality of resilient connectors respectively provided at a top edge and a bottom edge of said accessing window to detachably mount said PDA device within said accessing window in position, wherein said resilient connector at said top edge of said accessing window is aligned with said resilient connector at said bottom edge of said accessing window, wherein said PDA device has a plurality of connector slots formed along a top rim and a bottom rim respectively, wherein said resilient connectors are detachably engaged with said connector slots respectively to detachably mount said PDA device to said PDA station at the accessing window thereof.

3. The PDA arrangement, as recited in claim 2, wherein said accessing window of the first casing has a boundary frame defining the top and bottom edges thereat and having a plurality of spaced apart connector holes formed thereon, wherein said first casing further comprises a plurality of connector seats spacedly supported in said boundary frame, wherein each of said connector seats has a retaining slot aligning with said corresponding connector hole, wherein a resilient element is disposed in said retaining slot, wherein each of the resilient connectors comprises an elongated connector head protruding from said boundary frame through said respective connector hole, an elongated connector tail urged by said resilient element, and a retaining body extended between said connector head and said connector tail to bias against said boundary frame.

4. The PDA arrangement, as recited in claim 3, wherein each of said resilient connectors is slidably mounted at said boundary frame at a position that said connector tail is slidably disposed at said respective retaining slot while said connector head is slidably protruded through said respective connector hole.

5. The PDA arrangement, as recited in claim 1, wherein said PDA station further comprises at least two wireless transceivers and has at least two wireless transceiver windows which are provided at top and bottom edges of said accessing window respectively and are positioned aligning with said wireless transceivers respectively, wherein when said PDA device is detachably mounted at said accessing window, wireless transmitter of said PDA device is aligned with said wireless transceiver through said wireless transceiver windows for wireless data transmitting.

6. The PDA arrangement, as recited in claim 1, wherein said PDA station further comprises a speaker unit provided at said second casing to output an audio signal from said PDA device, an external port provided at said second casing for communicatively connecting an external device, a rechargeable battery supported in said second casing to electrically connect to said operation circuit, and a circuit board printed with said operation circuit thereon, wherein said circuit board is operatively connected to said resilient connectors to connect said operation circuit with said resilient connectors.

* * * * *